(12) United States Patent
Tuli et al.

(10) Patent No.: US 11,301,551 B2
(45) Date of Patent: *Apr. 12, 2022

(54) COMPUTING ASSET ACCESS CONTROL

(71) Applicant: eBay Inc., San Jose, CA (US)

(72) Inventors: Vikram Tuli, San Jose, CA (US); Daniel Morales, San Jose, CA (US)

(73) Assignee: eBay Inc., San Jose, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/801,919

(22) Filed: Feb. 26, 2020

(65) Prior Publication Data

US 2020/0193002 A1 Jun. 18, 2020

Related U.S. Application Data

(63) Continuation of application No. 15/642,980, filed on Jul. 6, 2017, now Pat. No. 10,606,990.

(51) Int. Cl.
*G06F 21/31* (2013.01)
*G06N 3/08* (2006.01)
(Continued)

(52) U.S. Cl.
CPC .......... *G06F 21/316* (2013.01); *G06F 21/552* (2013.01); *G06F 21/577* (2013.01);
(Continued)

(58) Field of Classification Search
CPC ........ G06F 21/316; G06F 21/552; G06N 3/02
See application file for complete search history.

(56) References Cited

U.S. PATENT DOCUMENTS 6,564,227 B2 ‡ 5/2003 Sakakibara ......... G06F 11/0709
6,871,322 B2 ‡ 3/2005 Gusler .................... G06F 9/453
715/70

(Continued)

FOREIGN PATENT DOCUMENTS

EP  2629229    ‡  8/2013
EP  2629229 A2   8/2013

(Continued)

OTHER PUBLICATIONS

"International Application Serial No. PCT US2018 040707, Written Opinion dated Aug. 24, 2018", 5 pgs.‡

(Continued)

*Primary Examiner* — Viral S Lakhia
(74) *Attorney, Agent, or Firm* — Shook, Hardy & Bacon

(57) ABSTRACT

Access to computing assets is controlled by dynamically selecting an authentication process for an access attempt to a computing asset. In an example embodiment, when an indication of an access attempt for a computing asset is received, a security level associated with the computing asset is determined. Based on the security level associated with the computing asset, an authentication process is selected from a plurality of authentication processes, and the selected authentication process is executed in relation to the access attempt for the computing asset. In further embodiments, the authentication process is further selected based on a comparison of an access characteristic associated with the access attempt for the computing asset and an access characteristic for a user associated with the access attempt.

20 Claims, 9 Drawing Sheets

(51) Int. Cl.
*G06F 21/57* (2013.01)
*G06N 5/02* (2006.01)
*G06F 21/55* (2013.01)
*G06N 3/02* (2006.01)

(52) U.S. Cl.
CPC .............. *G06N 3/02* (2013.01); *G06N 3/08* (2013.01); *G06N 5/022* (2013.01); *G06F 2221/2101* (2013.01); *G06F 2221/2111* (2013.01); *G06F 2221/2141* (2013.01)

(56) References Cited

U.S. PATENT DOCUMENTS

| | | | | |
|---|---|---|---|---|
| 8,306,931 | B1 ‡ | 11/2012 | Bowman | G06N 3/0454 706/27 |
| 8,515,892 | B2 ‡ | 8/2013 | Spring | G10L 15/1822 706/46 |
| 8,667,059 | B2 ‡ | 3/2014 | Singh | G06Q 30/02 709/20 |
| 8,683,546 | B2 ‡ | 3/2014 | Dunagan | G06F 21/577 726/1 |
| 8,712,912 | B2 ‡ | 4/2014 | Carlson | G06Q 20/04 705/35 |
| 8,875,267 | B1 ‡ | 10/2014 | Kolman | G06F 21/31 726/7 |
| 8,880,893 | B2 | 11/2014 | Moghe et al. | |
| 8,897,820 | B2 | 11/2014 | Marovets | |
| 8,925,069 | B2 * | 12/2014 | Louboutin | G06F 21/445 726/16 |
| 9,223,950 | B2 * | 12/2015 | Li | H04L 63/083 |
| 9,262,278 | B2 ‡ | 2/2016 | Ben Romdhane | G06F 11/1458 |
| 9,396,332 | B2 | 7/2016 | Abrams et al. | |
| 9,405,897 | B1 | 8/2016 | Bailey et al. | |
| 9,450,961 | B2 * | 9/2016 | Stanasolovich | H04L 63/10 |
| 9,516,053 | B1 ‡ | 12/2016 | Muddu | G06N 5/022 |
| 9,654,477 | B1 * | 5/2017 | Kotamraju | H04L 63/102 |
| 9,721,086 | B2 * | 8/2017 | Shear | G06F 21/53 |
| 9,875,347 | B2 * | 1/2018 | Baghdasaryan | H04L 63/08 |
| 10,044,761 | B2 | 8/2018 | Ducatel et al. | |
| 10,108,791 | B1 * | 10/2018 | Masterman | G06F 21/32 |
| 10,237,298 | B1 * | 3/2019 | Nguyen | H04L 63/10 |
| 10,375,119 | B2 * | 8/2019 | Aronowitz | H04L 63/08 |
| 10,404,729 | B2 | 9/2019 | Turgeman | |
| 10,606,990 | B2 | 3/2020 | Tuli et al. | |
| 10,606,992 | B2 * | 3/2020 | Morita | G06F 21/34 |
| 10,776,464 | B2 * | 9/2020 | Wilson | H04L 9/3231 |
| 11,017,404 | B1 * | 5/2021 | Chang | G06F 21/554 |
| 11,068,136 | B1 * | 7/2021 | Koushik | G06F 3/04842 |
| 2008/0250495 | A1 ‡ | 10/2008 | Hayashi | G06F 21/31 726/21 |
| 2012/0060207 | A1 ‡ | 3/2012 | Mardikar | H04L 63/105 726/4 |
| 2013/0133023 | A1 ‡ | 5/2013 | Burstein | H04L 63/08 726/1 |
| 2013/0138587 | A1 ‡ | 5/2013 | Patil | G06N 3/126 706/12 |
| 2013/0198383 | A1 | 8/2013 | Tseng et al. | |
| 2013/0227712 | A1 ‡ | 8/2013 | Salem | G06F 21/6218 726/30 |
| 2015/0339477 | A1 | 11/2015 | Abrams et al. | |
| 2015/0371236 | A1 ‡ | 12/2015 | Wen | G06Q 30/016 705/30 |
| 2016/0056850 | A1 * | 2/2016 | Nagase | H03K 5/04 375/340 |
| 2016/0063229 | A1 ‡ | 3/2016 | Key | G06F 21/316 726/1 |
| 2016/0132673 | A1 ‡ | 5/2016 | Birk | G06F 21/30 726/19 |
| 2017/0093920 | A1 | 3/2017 | Ducatel et al. | |
| 2017/0118223 | A1 * | 4/2017 | Mathew | G06F 21/6218 |
| 2017/0295181 | A1 * | 10/2017 | Parimi | H04L 63/1433 |
| 2018/0005246 | A1 ‡ | 1/2018 | Basam | G06Q 30/016 |
| 2018/0012005 | A1 | 1/2018 | Hallock | |
| 2018/0189470 | A1 * | 7/2018 | Kim | G06F 21/45 |
| 2019/0012441 | A1 | 1/2019 | Tuli et al. | |
| 2019/0311105 | A1 * | 10/2019 | Beiter | G06F 21/316 |

FOREIGN PATENT DOCUMENTS

| | | |
|---|---|---|
| WO | 2001/091479 A2 | 11/2001 |
| WO | WO-0191479 ‡ | 11/2001 |
| WO | 2019/010174 A1 | 1/2019 |

OTHER PUBLICATIONS

"International Application Serial No. PCT US2018 040707, International Search Report dated Aug. 24, 2018", 4 pgs.‡
Applicant Initiated Interview Summary received for U.S. Appl. No. 15/642,980, dated Jul. 16, 2019, 3 pages.
Non-Final Office action received for U.S. Appl. No. 15/642,980, dated Apr. 19, 2019, 19 pages.
Notice of Allowance received for U.S. Appl. No. 15/642,980, dated Nov. 19, 2019, 8 pages.
Preliminary Amendment filed on Jun. 7, 2018, for U.S. Appl. No. 15/642,980, 8 pages.
Response to Non-Final Office Action filed on Aug. 6, 2019 for U.S. Appl. No. 15/642,980, dated Apr. 19, 2019, 13 pages.
International Preliminary Report on Patentability received for PCT Application No. PCT/US2018/040707, dated Jan. 16, 2020, 7 pages.
International Search Report for PCT Application No. PCT/US2018/040707, dated Aug. 24, 2018, 4 pages.
International Written Opinion received for PCT Application No. PCT/US2018/040707, dated Aug. 24, 2018, 5 pages.

\* cited by examiner
‡ imported from a related application

COMPUTING ASSET ACCESS CONTROL

CROSS-REFERENCE TO RELATED APPLICATIONS

This patent application is a continuation of U.S. patent application Ser. No. 15/642,980, filed Jul. 6, 2017, which is incorporated herein by reference in its entirety.

TECHNICAL FIELD

Embodiments of the present disclosure relate generally to data processing and, more particularly, but not by way of limitation, to a system for facilitating and controlling access to computing assets.

BACKGROUND

Modern cloud-based computing technologies, such as Software-as-a-Service (SaaS), Platform-as-a-Service (PaaS), and the like, have allowed large organizations, such as corporations and governmental entities, to efficiently provide members of the organization, as well as others related to that organization, access to any number of applications useful for completing their assigned duties. Given that each member typically plays a particular operational role (e.g., salesperson, engineer, manufacturing manager, and so on) within the organization, the particular software applications and other computing assets to which that particular member has access may be tailored in large part to that specific role to reduce the overall computing system costs associated with such access.

While cloud-based technologies have greatly increased the accessibility of the computing assets by members of the organization, such as by way of multiple devices (e.g., desktop computer, laptop computer, tablet computer, smart phone, and the like), thus potentially increasing the productivity of the organization, such accessibility comes at the potential cost of security vulnerabilities due to the potentially large number of members employing multiple devices to access multiple computing assets, at least some of which may involve data of critical importance to the organization. Moreover, as the number of accessing members and the number of applications both grow within the organization, those security vulnerabilities become a greater threat to the organization and its mission.

BRIEF DESCRIPTION OF THE DRAWINGS

Various ones of the appended drawings merely illustrate example embodiments of the present disclosure and cannot be considered as limiting the scope of the disclosure.

The headings provided herein are merely for convenience and do not necessarily affect the scope or meaning of the terms used.

DETAILED DESCRIPTION

The description that follows includes systems, methods, techniques, instruction sequences, and computing machine program products that embody, illustrative example embodiments of the disclosure. In the following description, for the purposes of explanation, numerous specific details are set forth in order to provide an understanding of various example embodiments. It will be evident, however, to those skilled in the art, that example embodiments may be practiced without these specific details. In general, well-known instruction instances, protocols, structures, and techniques are not necessarily shown in detail.

Figure 1:
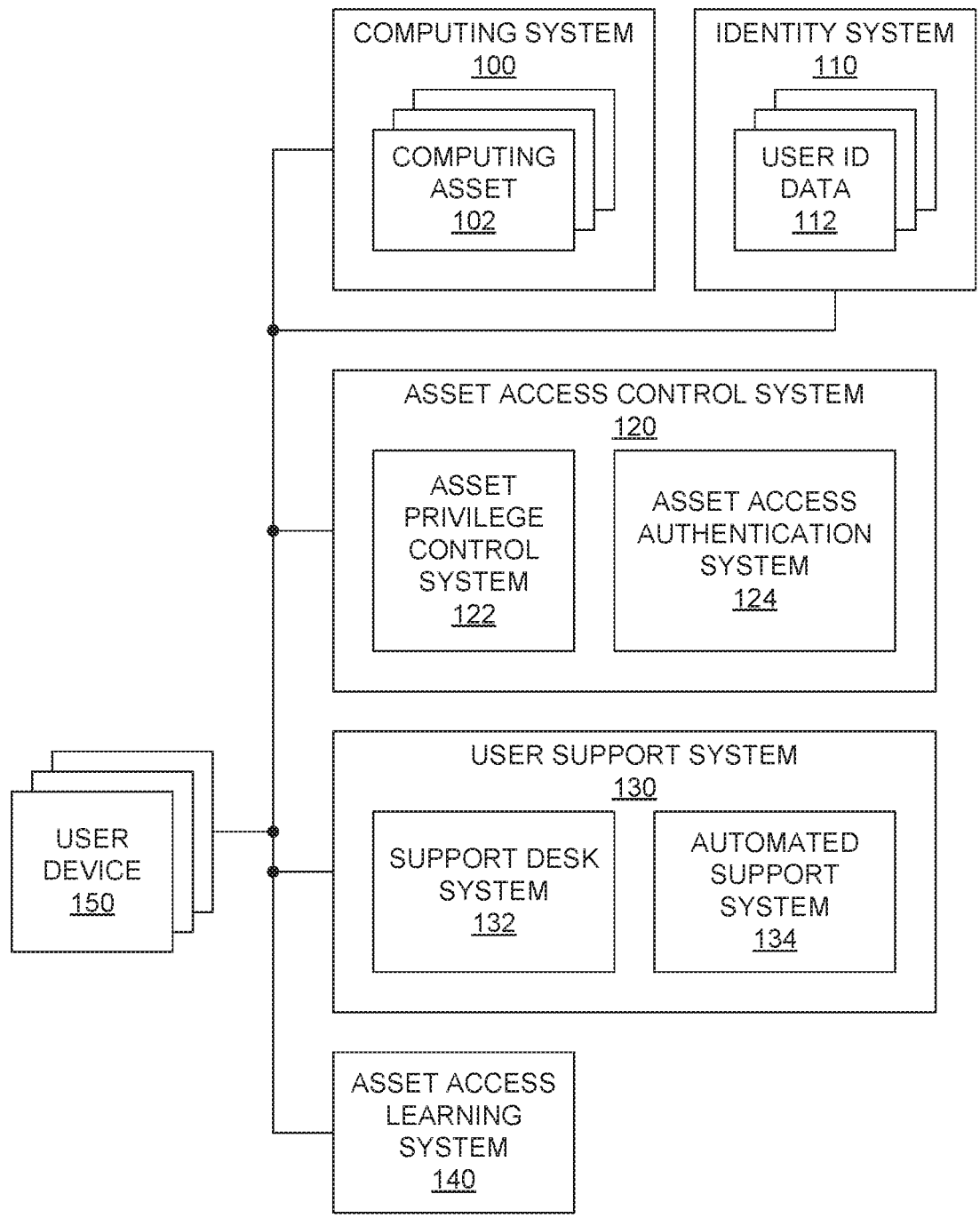
FIG. 1 is a block diagram of an example computing system and associated assets configured for access by multiple user devices under the control of an example asset access control system guided by an example asset access learning system.

FIG. 1 is a block diagram of an example computing system 100 and associated computing assets 102 configured for access by multiple user devices 150. While the computing system 100 is depicted in FIG. 1 as a single computing system, the computing system 100 may include multiple, separately identifiable computing systems, such as servers (e.g., application servers, web proxy servers, database servers, message servers, and so on). Each of the computing assets 102 may be a software application (e.g., an engineering application, a sales application, a word processing application, a spreadsheet application, and so on), a software service (e.g., a database service, a messaging service, and the like), a hardware component (e.g., data storage device, a processing device, or the like), or any other computing asset 102 to which access by one or more user devices 150 may be selectively, granted and/or controlled.

Each user device 150 may be a computing and/or communication device operated by an individual to access one or more of the computing assets 102 of the computing system 100. Example embodiments of the user devices 150 may include, but are not limited to, desktop computers, laptop computers, tablet computers, and smart phones. Each user device 150 may communicate with the computing system 100 and other components (e.g., an identity system 110, an asset access control system 120, and a user support system 130) of FIG. 1 described below by way of a communication network, such as a wide area network (WAN) (e.g., the Internet), a wireless WAN (WWAN), a local area network (LAN), a wireless LAN (MAN), a virtual private network (VPN), another type of network, or a combination of two or more such networks. Also in example embodiments, the users of the user devices 150 may be members of an organization (e.g., employees and contractors of a corporation, governmental organization, or the like) that provides and/or controls access to the computing system 100. While the user devices 150 are illustrated as a group in FIG. 1, many user devices 150 may be geographically distant from each other and the computing system 100, such as by being located in different towns, states, or countries, thus allowing remote access by the user devices 150 to the computing system 100

In example embodiments, the identity system 110 may be a computing system configured to maintain user identification data 112 regarding each user of the computing system 100 and the associated user devices 150 for each user. The user identification data 112 for a particular user may be employed to identify users and their corresponding user devices 150 for purposes of authorizing and controlling access by the users via the user devices 150 to the computing assets 102, including determining a particular privilege level of access to a computing asset 102 by a user or user device 150, authentication of the user or user device 150 to enable access, and so on. Examples of the user identification data 112 may include, but are not limited to, user name, user contact information (e.g., phone number, email address, postal address, etc.), user operational role (e.g., organization department, user title, and so on), and user device 150 identification information (media access control (MAC) address, Internet Protocol (IP) address, device location, device name, and the like).

The asset access control system 120, in example embodiments, may be configured to grant access and related privilege levels to one or more users for access via user devices 150 to one or more computing assets 102 of the computing system 100 by way of an asset privilege control system 122. In addition, the asset access control system 120 may authenticate (e.g., verify the identity of) users requesting or engaging in access with the various computing assets 102 via an asset access authentication system 124. The asset privilege control system 122 and the asset access authentication system 124 may include one or more computing systems that communicate with users via the user devices 150, as well as with the computing system 100, the identity system 110, the user support system 130, and an asset access learning system 140 described in greater detail below. Authentication of a user may involve, for example, verification of one or more authentication factors, such as a user name, a password, and/or other information (e.g., answers to security questions) entered by a user via the user device 150 before allowing access to a computing asset 102, changes to access and privilege levels of a computing asset 102, and so forth.

In an example embodiment, the user support system 130 may be configured to provide support services to users regarding access and use of the computing assets 102 to which the user currently maintains access. As depicted in FIG. 1, the user support system 130 may include one or both of a support desk system 132 and an automated support system 134. The support desk system 132 may be a computing system that provides useful information to a customer service representative (e.g., information technology (IT) representative engaged with a user (e.g., via phone, chat service, email, and Short Message Service (SMS))) to resolve problems the user encounters when accessing and using one or more computing assets 102, or at least inform the user regarding potential resolutions to problems with the computing assets 102. In some example embodiments, the user support system 130 may employ an automated support system 134 that may receive information (e.g., via an online webpage, SMS, voice response unit (VRU), and the like) from a user regarding problems accessing or using one or more computing assets 102, and may provide information to the user regarding potential solutions to problems, expected time to resolution of problems, and the like. In some example embodiments, the user support system 130 may communicate with one or more of the computing system 100, the identity system 110, the asset access control system 120, and the asset access learning system 140.

In example embodiments described in greater detail below, the asset access learning system 140 may be configured to employ one or more machine learning algorithms to process information regarding one or more of the users, the associated user devices 150, the access and associated privilege levels granted to the users for using one or more of the computing assets 102, actual access and/or use of those computing assets 102, and so on in order to generate and provide information to the asset access control system 120 and/or the user support system 130 to enhance or augment the operation of those systems. In an example embodiment, the asset access learning system 140 may control the number of levels or types of authentication (e.g., in a multi-level authenticating process) by a reputed user depending on a history of that user, as well as other users, with the computing asset 102 being accessed. Also in an example embodiment, the asset access learning system 140 may facilitate temporary granting of elevated access privileges of a user, again based on a history of that user, as well as other users. Other embodiments employing the asset access learning system 140 in conjunction with either or both of the asset access control system 120 and the user support system 130 are discussed more fully below.

Figure 2:
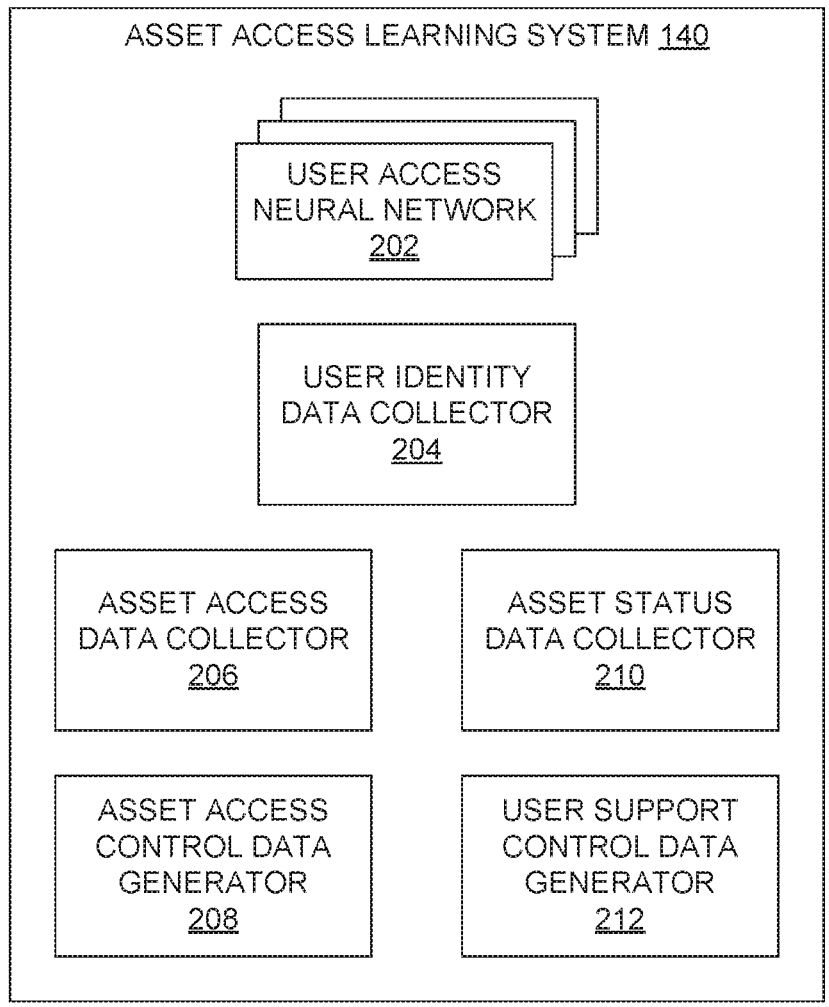
FIG. 2 is a block diagram of an example of the asset access learning system of FIG. 1.

FIG. 2 is a block diagram of an example of the asset access learning system 140 of FIG. 1. As depicted in FIG. 2, the asset access learning system 140 may include one or more user access neural networks 202, a user identity data collector 204, an asset access data collector 206, an asset status data collector 210, an asset access control data generator 208, and a user support control data generator 212. Each of the modules 202-212 may be comprised of hardware, software executable on a processor, or some combination thereof. In other example embodiments, greater or fewer numbers of modules may be employed, and two or more of the modules may be combined or subdivided to create different modules. Moreover, other modules not explicitly mentioned herein may be included in the asset access learning system 140, but are not discussed herein to simplify and focus the following discussion.

In the following example embodiments, artificial neural networks (ANNs) are utilized as the basis for the machine learning algorithms employed in the asset access learning system 140. However, in other example embodiments not explicitly described herein, the machine learning algorithms of the asset access learning system 140 may be executed by employing other types of logical or computational structures, such as decision trees, support vector machines (SVMs), Bayesian networks, and so on.

In an example embodiment, each user of the computing system 100 may be associated with a separate user access neural network 202. In that example, each user access neural network 202 may take as input, and subsequently embody, information regarding the user (e.g., user name, contact information, operational role within the organization (e.g., department name, business title, etc.), information regarding the particular computing assets 102 to which the user currently has, and formerly had, been granted access (e.g., identification of the computing asset 102, privilege level granted the user for the computing asset 102, etc.), the user devices 150 of the user (e.g., identifying information (e.g., MAC address, IP address, location information)) of each user device 150, information regarding the particular computing assets 102 accessed via the user device 150 (e.g., identification of the computing asset 102, time and place at which both successful and unsuccessful accesses of the computing asset 102 occurred, security risk or sensitivity associated with the data accessible via the computing asset 102, etc.), and so forth. Overall, this information, as embodied or consumed within the user access neural network 202, may form a network graph that represents relationships between the user, the network assets 102 being accessed by the user, and possibly other users. Also in some example embodiments, the user access neural networks 202 of the individual users may be coupled to form a larger neural network such that similarities and differences between the users, the user devices 150, and their access to the computing assets 102 may be used to control future access, authentication, and user support functions. In yet other example embodiments, a single user access neural network 202 may be employed for all users of the computing system 100.

In some example embodiments, the various types of information described above from various systems depicted in FIG. 1 are collected and input to each of the user access neural networks 202 on a continual or ongoing basis. To facilitate this data collection, the asset access learning system 140 may employ the user identity data collector 204 to collect user information from the identity system 110; the asset access data collector 206 to collect asset access information from the computing assets 102, the asset privilege control system 122, and/or the asset access authentication system 124; and the asset status data collector 210 to collect asset status information from the computing assets 102, the support desk system 132, and/or the automated support system 134. In some example embodiments, the user identity data collector 204, the asset access data collector 206, and the asset status data collector 210 may employ one or more application programming interfaces (APIs) provided by the computing system 100, the identity system 110, the asset access control system 120, and the user support system 130, or portions thereof, to collect the data from each of those systems. In other example embodiments, the data collectors 204, 206, 210 may provide one or more APIs accessible by the various systems 100, 110, 120, and 130 so that those systems may push the data to the asset access learning system 140 as it is generated. In some example embodiments, the data collectors 204, 206, 210 may process (e.g., transform, scale, normalize, and so on) the incoming data as it is collected before providing the information to the user access neural networks 202.

The results or outputs of each of the user access neural networks 202 may then be provided to one or both of the asset access control data generator 208 and the user support control data generator 212. For example, the user access neural network 202 for a particular user may generate analytics data (e.g. link analytics, presence analytics, risk analytics, and so on), indications of anomalies in user access to one or more computing assets 102 compared to previous access history of the user or other similarly situated users, and so on. In example embodiments, the asset access control data generator 208 provides data to augment the operation of the asset access control system 120 (e.g., the asset privilege control system 122 and the asset access authentication system 124), and the user support control data generator 212 provides data to augment the operation of the user support system 130 (e.g., the support desk system 132 and the automated support system 134).

Figure 3:
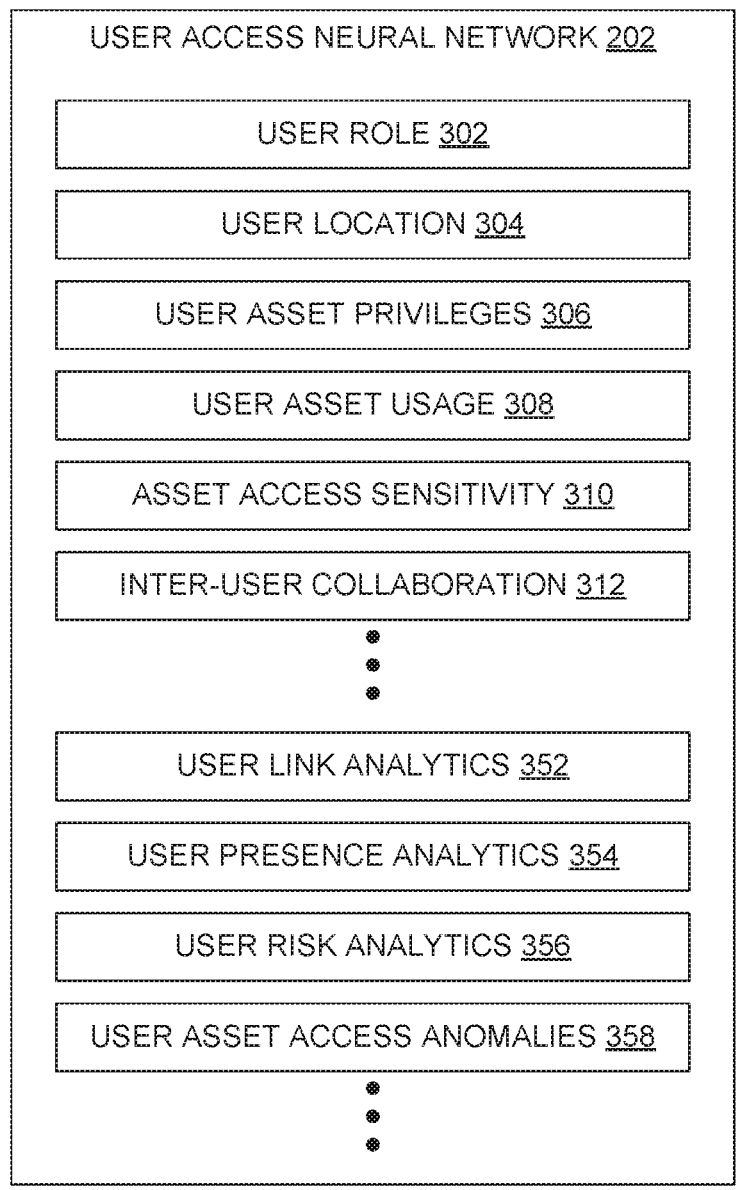
FIG. 3 is a block diagram of example types of data provided to and produced using an example neural network of an example of the asset access learning system of FIG. 2.

FIG. 3 is a block diagram of example types of data provided to and produced by an example user access neural network 202 of FIG. 2, such as via the data collectors 204, 206, 210 of FIG. 2. In example embodiments, the user access neural network 202 for a user may receive and embody information describing a user role 302 (e.g., the operational role played by the user within the organization), a user location 304 (e.g., the geographic location of the user at various times, including times when the user accesses one or more computing assets 102), user asset privileges 306 (e.g., the identification of the computing assets 102 to which the user has been granted access, the particular privilege or access level associated with that access, and so on), user asset usage 308 (e.g., where the user was when he used each computing asset 102, days and times during which the computing asset 102 was used, the particular user device 150 employed to access the computing asset 102, and the like), asset access sensitivity 310 (e.g., information indicating the level of data criticality or sensitivity involved when the user accesses various computing assets 102), inter-user collaboration 312 (e.g., information regarding collaboration between the user and other users of the organization by employing one or more of the computing assets 102), and other types of data, such as those described earlier.

In processing the various input data types 302-312, the user access neural network 202 for a user may generate a number of different types of output data for use by the data generators 208, 212 of FIG. 2. In example embodiments, such output data may include user link analytics 352 (e.g., information indicating relationships between the user and other users, between the user and various computing assets 102, and so on), user presence analytics 354 (e.g., information indicating the location of the user devices 150 utilized by the user to access the various computing assets 102), and user risk analytics 356 (e.g., information indicating a level of risk involved in the user accessing the various computing assets 102, either or both on an asset-by-asset basis, or across all computing assets 102 accessed). In example embodiments, the user link analytics 352 may include one or more correlation metrics associating the network graph of the user with the network graphs of other users, thus indicating one or more similarities between the user and other users regarding access to the computing assets 102 (e.g., similarities in the particular computing assets 102 being accessed, similarities in the frequency and/or duration of access to each of those computing assets 102, similarities in the particular roles within an organization (e.g., engineer, salesperson, manager, etc.) corresponding to each of the users, and the like). Also, the output data may include user asset access anomalies 358 (e.g., information indicating particular attempted or successful accesses of one or more computing assets 102 that exhibit at least one anomaly relative to other accesses, such as by way of the user device 150 employed, the time and/or day of the access, and so on). Other types of output data not discussed in detail herein may be generated in other example embodiments.

Figure 4:
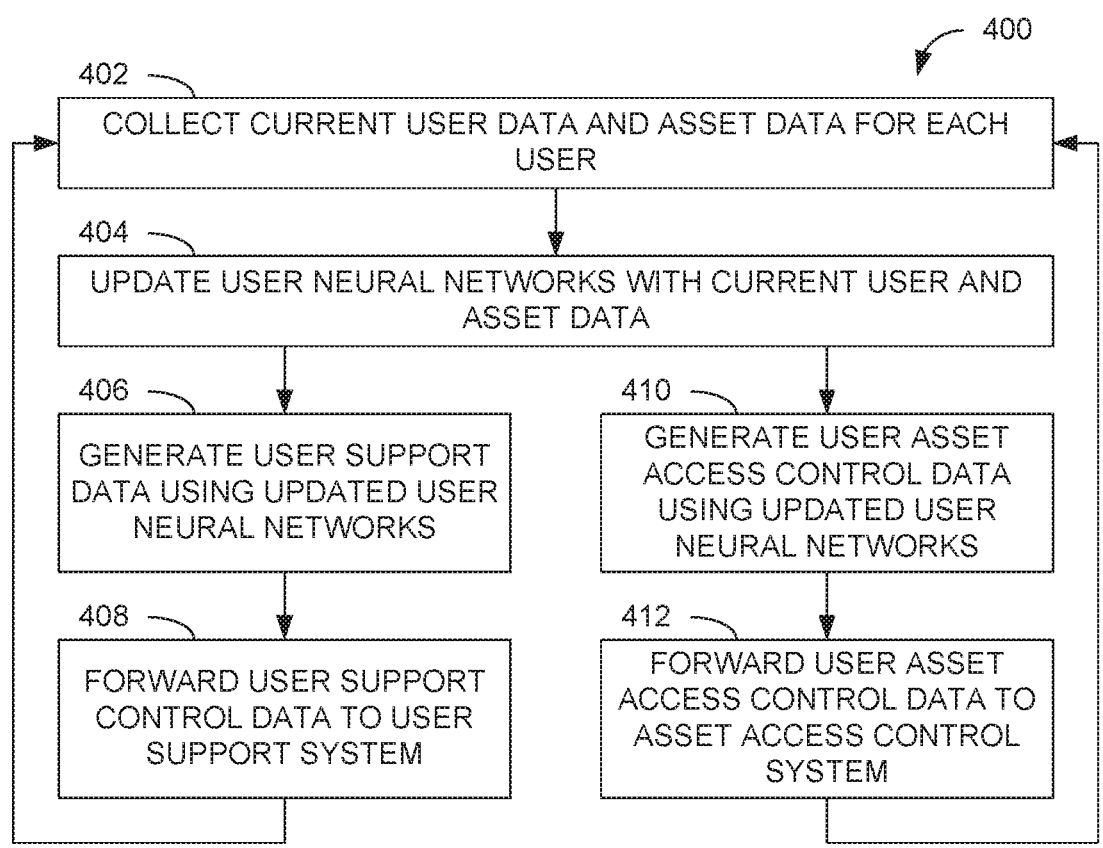
FIG. 4 is a flow diagram of an example method of operating an example of the asset access learning system of FIG. 2.

FIG. 4 is a flow diagram of an example method 400 of operating an example of the asset access learning system 140 of FIG. 2. While execution of the method is described in conjunction with the asset access learning system 140, other systems or devices not specifically described herein may be employed to perform the method 400 in other examples.

In the method 400, current user data user identification data 112) and asset data (e.g., data generated by the computing assets 102 when accessed and used by a user) for each user is collected (e.g., using the data collectors 204, 206, 210 of FIG. 2) (operation 402). Each user access neural network 202 is updated using the collected data (operation 404), Based on the updated user access neural networks 202, both user support control data (operation 406) and user asset access control data (operation 410) are generated (e.g., using the control data generators 208, 212). The generated user support data is forwarded to the user support system 130 (operation 408), and the generated user asset access control data is forwarded to the asset access control system 120 (operation 412). In some example embodiments, performance of the various operations 402-412 may overlap in time, as the collection of information, updating of the user access neural networks 202, and the generating and forwarding of the resulting control data may occur on a continual or ongoing basis over time.

Figure 5:
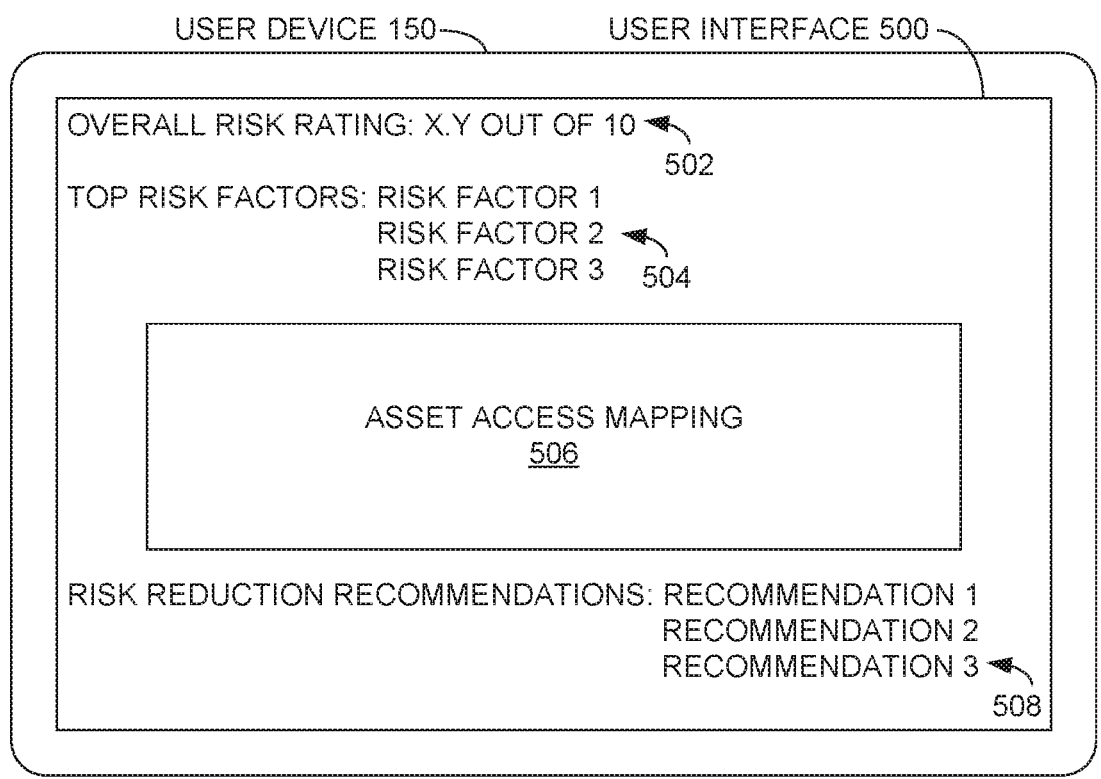
FIG. 5 is a graphical representation of an example user interface for providing information relating to risks associated with access to computing assets granted to a particular user.

As mentioned above, the asset access control system 120 and the user support system 130 enhance and augment their various operations using the control data received from the asset access learning system 140. In addition, the asset access learning system 140 may generate information based on the collected data and the resulting output from the user access neural network 202 of a user that provides the user with information regarding the user's overall security risk profile, either directly or via the asset access control system 120. FIG. 5 is a graphical representation of an example user interface 500 (e.g., provided by a user device 150 of the user) for presenting information relating to risks associated with access to the computing assets 102 granted to a particular user. In this example, the user interface 500 may provide an overall risk rating 502 giving an indication (e.g., relative to other users) of the security risks associated with the computing assets 102 to which the user has been granted access. In example embodiments, the risk rating 502 may be based on a number of factors including, but not limited to, the type of data being accessed or processed via the computing asset 102 (e.g., access to more sensitive or secure data representing a higher risk), the type of user device 150 employed to access the computing asset 102 (e.g., mobile devices using a wireless connection representing a higher risk that desktop computers employing a wired connection to the network), the location of the user device 150 at the time of the access (e.g., accessing a computing asset 102 from home or a hotel representing a higher risk than accessing the computing asset 102 from a site of the organization), the privilege level granted to the user for access of the computing asset 102 (e.g., higher privilege levels being associated with higher risks), how often the user accesses the computing asset 102 (e.g., accessing the computing asset 102 more often possibly corresponding to a higher risk), and so on, as determined by the user access neural network 202. In an example embodiment, higher privilege levels correspond with greater levels of data or functional access provided by the computing asset 102 for the user.

Also in an example embodiment, the user interface 500 may present for display one or more risk factors 504 contributing to the overall risk rating 502, as determined by the user access neural network 202. For example, granted access to a particular database that includes extremely sensitive data (e.g., from a business or legal standpoint, such as customer billing information) may present a higher risk than access to another computing asset 102. In another example, accessing computing assets 102 more often from multiple mobile user devices 150 while located outside a physical site controlled by the organization may represent a greater risk than accessing the same computing assets 102 using a desktop computer onsite.

To aid the user in understanding the overall access to computing assets 102 that is currently being granted to the user, the user interface 500 may also provide an asset access mapping 506 (e.g., a graphical map, a listing, or the like) of the various computing assets 102 to which the user is currently granted access, possibly along with the various access privileges the user possesses for each of those computing assets 102. Moreover, the asset access mapping 506 may provide some indication of how often (or to what extent) the user employs each of the computing assets 102, the user devices 150 employed to access the computing assets 102, unsuccessful access attempts attributed to the user of the various computing assets 102, and other historical information regarding the user's access to the computing assets 102.

To address the risk factors 504 and the risk rating 502, the user interface 500 may also present a list of risk reduction recommendations 508 to the user that will reduce the number of risk factors 504 and the overall risk rating 502 associated with the user's access to the computing assets 102. For example, based on a finding by the user access neural network 202 that a high-risk computing asset 102 (e.g., a computing asset 102 that facilitates access to sensitive data) to which the user is granted access is rarely accessed by the user, or is accessed in a manner that is commensurate with a lower access privilege level than the one currently granted to the user, the user interface 500 may provide a recommendation to the user to lower the user's privilege level, or release the granted access outright, for the computing asset 102 involved. In some example embodiments, the user interface 500 may also provide a link or icon that, when activated by the user, causes the selected risk reduction recommendation to take effect by transmitting a request for that action to the asset privilege control system 122. In some example embodiments, the user's decision regarding the risk reduction recommendations 508 may be aided by the presentation of the asset access mapping 506, discussed above. In yet other examples, the asset access control system 120 may unilaterally adjust the access or associated privilege level granted to the user based on the same information received from the asset access learning system 140.

As a result of the operation of the user access neural network 202, as indicated via the user interface 500, the user may be provided with information that allows the user to make informed choices to reduce his overall risk profile regarding access to the computing assets 102, thus benefiting the organization as a whole. In other example embodiments, the operation of the asset access control system 120 may be augmented or enhanced more directly via the user access neural network 202 of each of the users in several ways.

Figure 6:
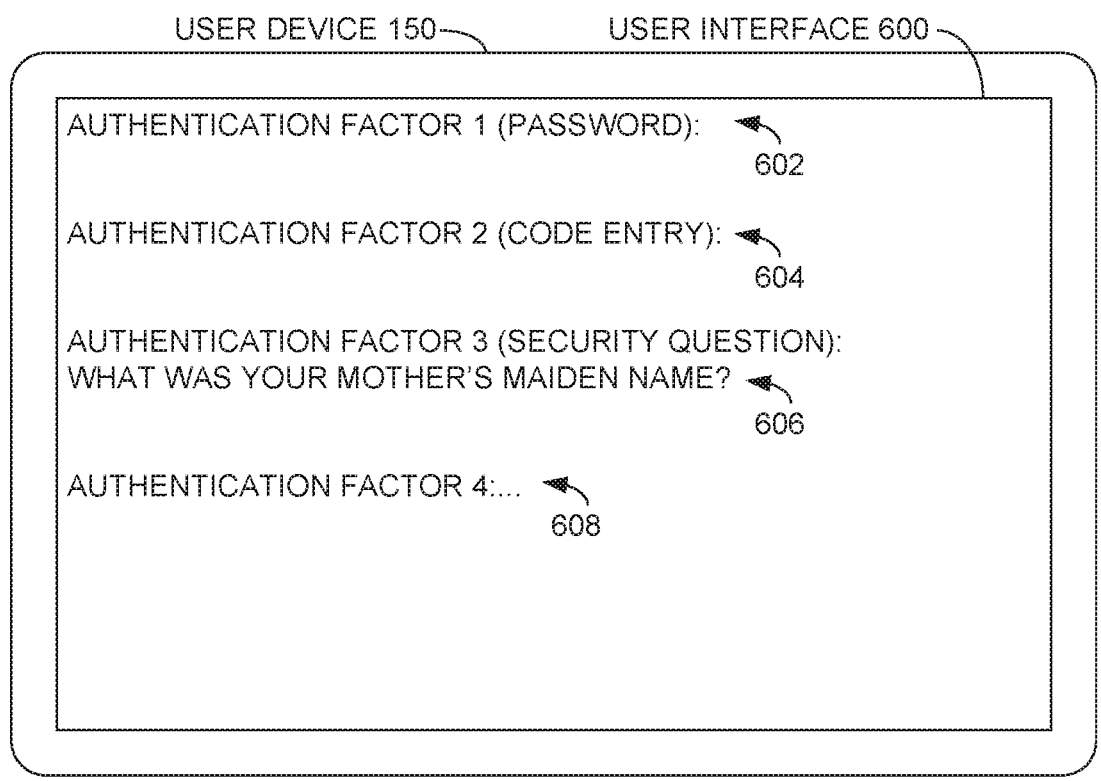
FIG. 6 is a graphical representation of an example user interface for facilitating a dynamic multi-factor authentication process for a user to access a computing asset.

FIG. 6 is a graphical representation of an example user interface 600 for facilitating a dynamic multi-factor authentication process for a user to access a computing asset 102. In an example embodiment, upon receipt of a current attempt by the user (or by someone masquerading as the user) to access a computing asset 102, the user access neural network 202 for the user may determine that such an access is anomalous to previous accesses of the computing asset 102 by the user, or by other users that are similar to the user, as determined by the user access neural networks 202. For example, the user may be employing a user device 150 not recognized by the user access neural network 202, the user device 150 may be located in a physical area not previously associated with the user, the user may be attempting access during an unusual time of day, the user may be requesting an enhanced privilege level of access to the computing asset 102, and so on. In this case, the asset access learning system 140 (e.g., via the asset access control data generator 208) may indicate to the asset access control system 120 (e.g., the asset access authentication system 124) that a higher level of authentication, such as by way of one or more additional authentication factors, and/or by way of a more difficult authentication factor, should be required for the current access attempt.

As shown in FIG. 6, the user interface 600, in response to an anomalous attempt to access a computing asset 102, may present multiple authentication factors 602, 604, 606, 608, at least one of which is not ordinarily required of the user when accessing this particular computing asset 102. More specifically, in addition to the usual password required (authentication factor 602), the user interface 600 may also request the entry of a particular code sent to a known user device 150 or account (e.g., email account) of the user (authentication factor 604), an answer to a security questions (authentication factor 606), and others (authentication factor 608). As a result, by providing such an adaptive authentication level scheme, a user accessing a computing asset 102 under circumstances that are typical for the user, or for other users similar to the user, will often gain access to the asset with a typical authentication scheme. Access attempts that are indicated by the asset access learning system 140 to be out of the ordinary for the user may cause an enhanced (e.g., multi-factor) authentication process to be performed. In some example embodiments, the level of authentication may be influenced by other factors, such as a level of security or sensitivity associated with the computing asset 102.

In some example embodiments, the asset privilege control system 122, by using input from the asset access learning system 140, may temporarily grant a user access to a particular computing asset 102, or grant the user a higher privilege level to a computing asset 102 to which the user already possesses access rights. In an example embodiment, such enhanced access may be provided as a one-time only access, for a particular period of time (e.g., a number of hours), or for some other limited time period. Such access may be acceptable to the user that rarely needs such access, such as once per financial quarter, or once per calendar year. In example embodiments, such access may be requested by the user as access to the particular computing asset 102 is attempted. In recognizing such an attempt, the user access neural network 202 of the asset access learning system 140, via the asset access control data generator 208, may provide data to the asset access control system 120 (e.g., the asset privilege control system 122 or the asset access authentication system 124) indicating the request for such access. In response, the asset access control system 120 may present, for example, the user interface 600 to impose elevated authentication (e.g., via additional authentication factors) to enhance the security of such an access. By thus facilitating dynamic changes in access rights and/or privilege levels for access by a particular user to a specific computing asset 102, the user may be granted periodic enhanced access to a computing asset 102 while allowing the user to retain an overall low risk profile and associated risk rating 502.

In an example embodiment, the user interface 600 may be presented to the user by way of a mobile application executing on the user device 150 (e.g., operating in the background) such that the ability to present such an authentication process to the user is possible dynamically at all times.

Figure 7:
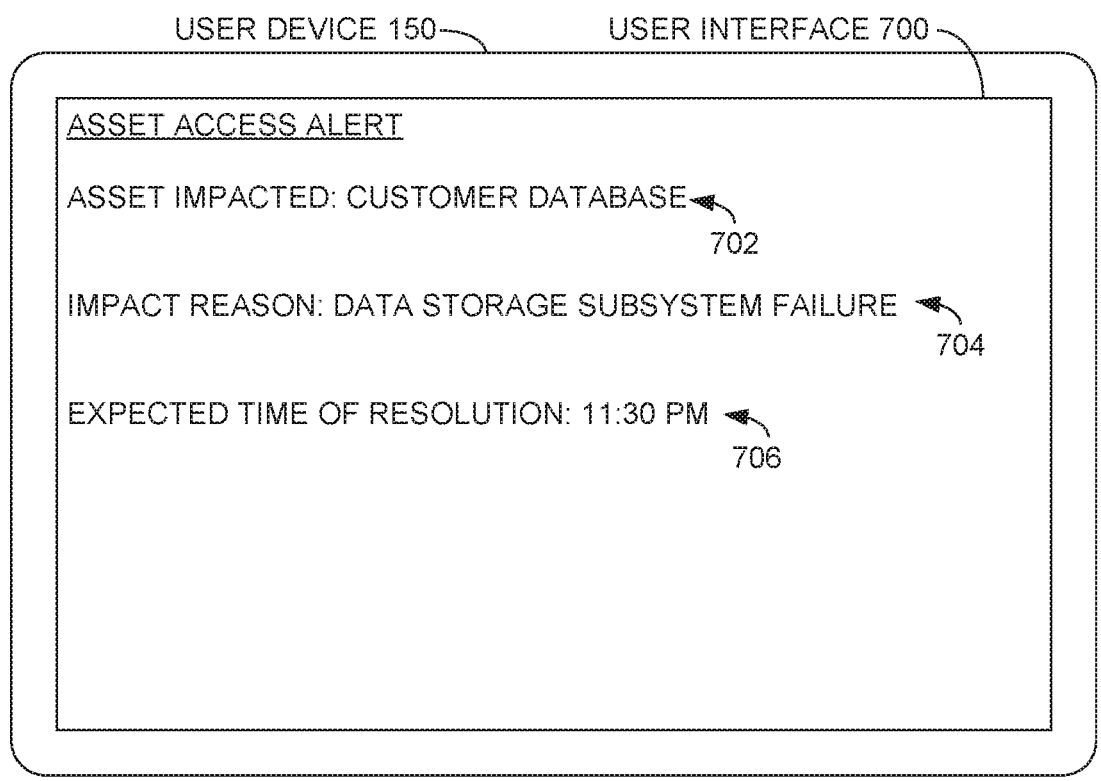
FIG. 7 is a graphical representation of an example user interface for providing an alert to a user regarding an operational status of a computing asset.

As indicated above, the asset access learning system 140 may also enhance the operation of the user support system 130 in some example embodiments. FIG. 7 is a graphical representation of an example user interface 700 for providing an alert to a user regarding an operational status of a computing asset 102. In an example embodiment, the asset access learning system 140 may proactively determine that a particular computing asset 102 is experiencing a failure impacting one or more other users of the organization, such as by way of information received at the user access neural networks 202 of other users that have been identified as similar in some way (e.g., by operational role (such as salesperson, marketing representative, software engineer, and so on), by access history to one or more computing assets 102 (such the particular one or more computing assets 102 being accessed by each of the users, the frequency and/or duration of access to the one or more computing assets 102 by each of the users), and so on) to the current user. Based on that determination, the user support system 130, by way of user interface 700, may provide an alert to the user that provides information regarding the failure, such as an identification 702 of the affected computing asset 102, a reason 704 for the failure, and an expected time 706 at which the failure is expected to be resolved. In an example embodiment, the alert may be sent to a user account (e.g., email account, mobile phone number, etc.) registered by the user with the identity system 110. By employing this proactive approach to disseminating information regarding a failure of a computing asset 102, the user support system 130 apprises those users that are identified by the asset access learning system 140 as being primarily affected by such a failure of the status of the computing asset 102 without requiting the user to attempt to access the computing asset 102 or to proactively consult the user support system 130. At the same time, those users that may possess access to the computing asset 102, but rarely access the computing asset 102, need not receive such an alert.

For example, a particular computing asset 102 (e.g., a customer database) may have failed, thus preventing access to that computing asset 102 for some period of time. The user support system 130 may become aware of the failure based on reports of the failure from one or more users, based on reports generated by an operator or technician, or based on information received directly from the computing asset 102. In response, the user support system 130 may employ data from the asset access learning system 140 to identify those users that often access one or more applications that, in turn, access the affected computing asset 102, and inform the identified users of the problem, such as by way of the user interface 700 of FIG. 7. Consequently, only those users most likely to be affected by the failure are notified.

In other example embodiments, the user may receive such an alert from the user support system 130 in response to receiving data from the asset access learning system 140 indicating a suspect or anomalous access attempt to a computing asset 102 performed in the name of the user. For example, the asset access learning system 140 may determine that the access attempt came from a user device 150 not previously associated with the user, or that the access attempt came from a geographic location not previously associated with the user.

In some example embodiments, a user may attempt to contact the user support system 130 (e.g., either by phone, chat, or email with a customer support representative accessing the support desk system 132, or online via the automated support system 134). For example, the user may have encountered a problem accessing or using a particular computing asset 102. As opposed to requiring the user to provide or enter information regarding the particular issue involved, the asset access learning system 140 employ the user access neural network 202 of the user to determine recent access activity by the user to identify the computing asset 102 involved; and possibly other information related to the access (e.g., the user device 150 being employed by the user to access computing asset 102; the location of the user device 150; the username, password, or other authentication information being provided by the user to access the computing asset 102; and so on). Based on information provided by the asset access learning system 140 (e.g. via the user support control data generator 212), the user support system 130 may determine the cause of the problem. In addition, the asset access learning system 140 may provide to the user support system 130 data from user access neural networks 202 of other users similarly situated to the user accessing the user support system 130 that may be indicative of a preexisting problem with the computing asset 102 that is already being encountered by the other users. The user support system 130 may then employ information to provide the requesting user with information regarding the problematic computing asset 102 in a timely manner without the user having to provide details regarding the issue that is currently being encountered by the user. Such information may be provided to the user automatically (e.g., via the automated support system 134) or employed by a customer service representative (e.g., via the support desk system 132) to allow the representative to resolve the user's issue more quickly.

Example Embodiments

In an example embodiment, a method comprises accessing access data for each user of a plurality of users, the access data for a respective user indicating an access history by the respective user to one or more of a plurality of available computing assets; analyzing, by a machine learning algorithm executing on one or more hardware processors, the access data of each user to generate at least one characteristic associated with the access data of each user; receiving an indication of a current access attempt of one of the available computing assets using an identity of a first user of the plurality of users; comparing at least one characteristic associated with the current access attempt to at least one characteristic associated with the access data of the first user; and selecting one of a plurality of authentication processes for presentation to the first user for the current access attempt based on the comparing of the at least one characteristic associated with the current access attempt to the at least one characteristic associated with the access data of the first user.

In another example embodiment, including all previous example embodiments, the selecting of the one of the plurality of authentication processes is further based on a requested privilege level associated with the current access attempt.

In another example embodiment, including all previous example embodiments, the method further comprises accessing identification data for each user, the identification data for a respective user describing an operational role assigned to the respective user within an organization, wherein the analyzing of the access data of each user is based on the operational role assigned to the respective user.

In another example embodiment; including all previous example embodiments, the analyzing of the access data of each user comprises identifying similarities between the access data of the first user and the access data of a second user of the plurality of users to generate the at least one characteristic associated with the access data of the first user.

In another example embodiment, including all previous example embodiments, the access data of the first user comprises a first network graph; the access data of the second user comprises a second network graph; and the method further comprises generating a correlation metric relating the first network graph to the second network graph, wherein the identifying of similarities between the access data of the first user and the access data of the second user is based on the correlation metric.

In another example embodiment, including all previous example embodiments, the selecting of the one of the plurality of authentication processes is further based on a security level associated with the one of the available computing assets.

In another example embodiment, including all previous example embodiments, the selecting of the one of the plurality of authentication processes is based on the at least one characteristic associated with the current access attempt being anomalous to the at least one characteristic associated with the access data of the first user.

In another example embodiment, including all previous example embodiments, the selected one of the plurality of authentication processes comprises a multi-factor authentication process.

In another example embodiment, including all previous example embodiments, the at least one characteristic comprises at least one of an identity of a source device of the current access attempt, a location of the source device of the current access attempt, and a time of day at which the current access attempt is made.

In another example embodiment, including all previous example embodiments, the method further comprises generating, based on the at least one characteristic associated with the access data of the first user, a corresponding risk rating for the first user; and causing presentation, via a user account registered to the first user, the corresponding risk rating.

In another example embodiment, including all previous example embodiments, the method further comprises causing presentation of at least one recommendation for altering access of the first user to one of the plurality of available computing assets to reduce the risk rating.

In another example embodiment, including all previous example embodiments, the altering of the access of the first user to the one of the plurality of available computing assets comprises lowering a privilege level of access of the first user to the one of the plurality of available computing assets.

In another example embodiment, including all previous example embodiments, the method further comprises generating an alert signal based on the comparing of the at least one characteristic associated with the current access attempt to the at least one characteristic associated with the access data of the first user indicating that the current access attempt is not originated by the first user; and transmitting the alert signal to a user account registered to the first user.

In another example embodiment, including all previous example embodiments, the method further comprises receiving a request from a user device of the first user to temporarily increase a privilege level of access for the first user to one of the plurality of available computing assets; and granting the request based on the at least one characteristic associated with the access data of the first user.

In another example embodiment, including all previous example embodiments; the method further comprises receiving a request from the first user for information regarding an inoperative computing asset; determining an identity of the inoperative computing asset based on the at least one characteristic associated with the access data of the first user; retrieving operational status information of the inoperative computing asset; and providing a response to the request based on the retrieved operational status information.

In another example embodiment, including all previous example embodiments, the analyzing of the access data of each user comprises identifying similarities between the access data of the first user and the access data of a second user of the plurality of users to generate the at least one characteristic associated with the access data of the first user, and the method further comprises determining whether to provide a notification of the operational status information to the second user based on the identified similarities between the access data of the first user and the access data of the second user; and transmitting the notification of the operational status information to a user account registered to the second user based on a determination that the notification is to be provided to the second user.

In another example embodiment, including all previous example embodiments, the method further comprises receiving an adverse operational status of one of the plurality of available computing assets; determining whether to provide a notification of the adverse operational status to the first user based on the at least one characteristic associated with the access data of the first user; and transmitting the notification of the adverse operational status to a user account registered to the first user based on a determination that the notification is to be provided to the first user.

In an example embodiment, a system comprises one or more hardware processors; and a memory storing instructions that, when executed by at least one of the one or more hardware processors, cause the system to perform operations comprising accessing access data for each user of a plurality of users, the access data for a respective user indicating an access history by the respective user to one or more of a plurality of available computing assets; analyzing, by a machine learning algorithm, the access data of each user to generate at least one characteristic associated with the access data of each user; receiving an indication of a current access attempt of one of the available computing assets using an identity of a first user of the plurality of users; comparing at least one characteristic associated with the current access attempt to the at least one characteristic associated with the access data of the first user; and selecting one of a plurality of authentication processes for presentation to the first user for the current access attempt based on the comparing of the at least one characteristic associated with the current access attempt to the at least one characteristic associated with the access data of the first user.

In another example embodiment, including all previous example embodiments, the analyzing of the access data of each user comprises identifying similarities between the access data of the first user and the access data of a second user of the plurality of users to generate the at least one characteristic associated with the access data of the first user.

In an example embodiment, a non-transitory computer-readable storage medium storing instructions that, when executed by at least one hardware processor of a machine, cause the machine to perform operations comprising accessing access data for each user of a plurality of users, the access data for a respective user indicating an access history by the respective user to one or more of a plurality of available computing assets; analyzing, by a machine learning algorithm; the access data of each user to generate at least one characteristic associated with the access data of each user; receiving an indication of a current access attempt of one of the available computing assets using an identity of a first user of the plurality of users; comparing at least one characteristic associated with the current access attempt to the at least one characteristic associated with the access data of the first user; and selecting one of a plurality of authentication processes for presentation to the first user for the current access attempt based on the comparing of the at least one characteristic associated with the current access attempt to the at least one characteristic associated with the access data of the first user.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application-Specific integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 may implemented in some embodiments in the context of a machine and an associated software architecture. The sections below describe representative software architectures and machine (e.g., hardware) architectures that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internee of things," while yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 8:
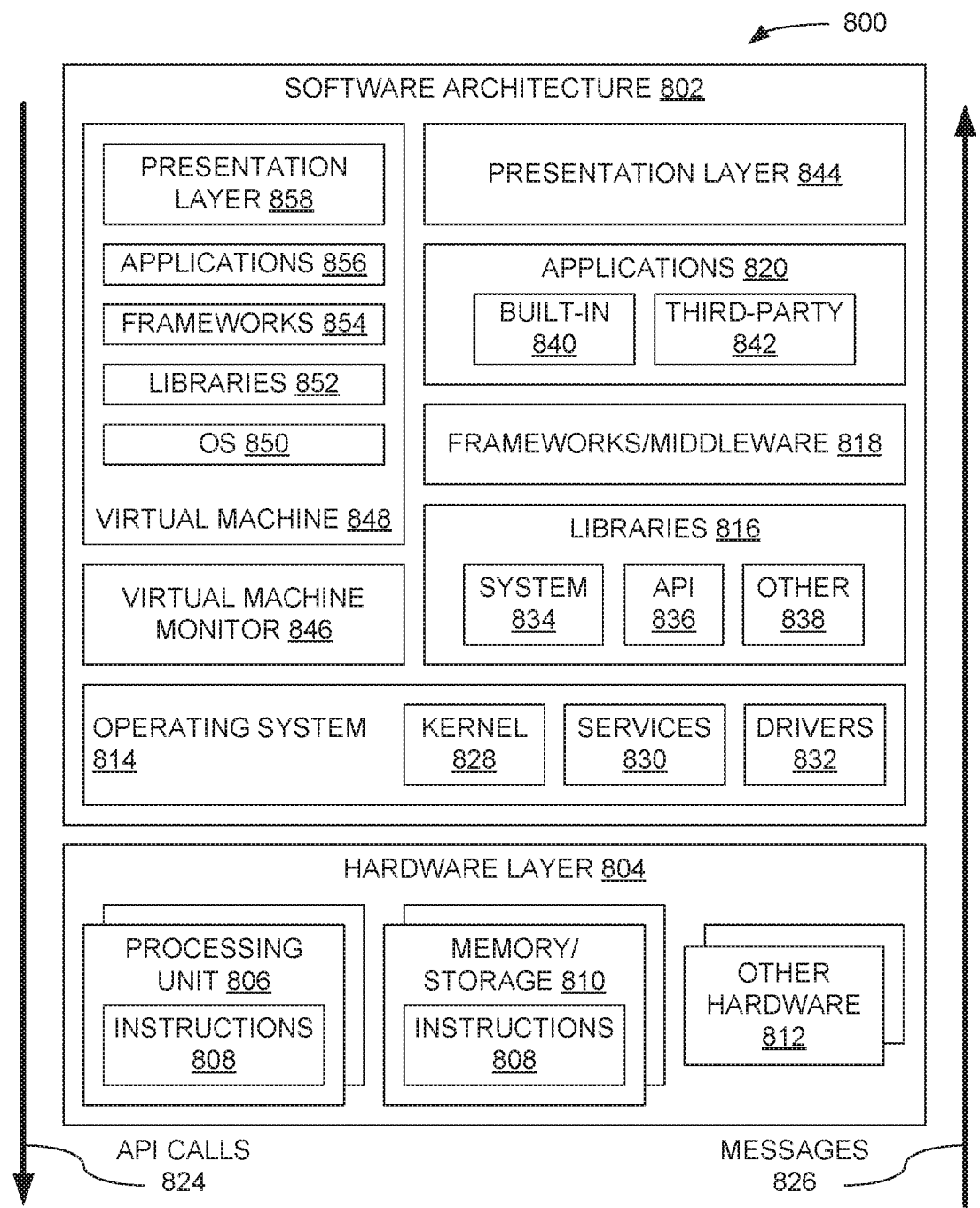
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture and it will be appreciated that many other architectures may be implemented to facilitate the functionality described herein. The software architecture 802 may be executing on hardware such as machine 900 of FIG. 9 that includes, among other things, processors 910, memory 930, and I/O components 950. A representative hardware layer 804 is illustrated and can represent, for example, the machine 900 of FIG. 9. The representative hardware layer 804 comprises one or more processing units 806 having associated executable instructions 808. Executable instructions 808 represent the executable instructions of the software architecture 802, including implementation of the methods, modules, and so forth associated with the asset access learning system 140 of FIG. 2, the method 400 of FIG. 4, and the associated modules, components, and the like discussed herein. Hardware layer 804 also includes memory and/or storage modules 810, which also have executable instructions 808. Hardware layer 804 may also comprise other hardware as indicated by 812 which represents any other hardware of the hardware layer 804, such as the other hardware illustrated as part of machine 900.

In the example architecture of FIG. 8, the software architecture 802 may be conceptualized as a stack of layers where each layer provides particular functionality. For example, the software 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking; security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers;

flash memory drivers, serial communication drivers (e.g., Universal Serial Bus (USB) drivers), Wi-Fi® drivers, audio drivers, power management drivers; and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions; string manipulation functions, mathematic functions, and the like. In addition, the libraries 816 may include API libraries 836 such as media libraries (e.g., libraries to support presentation and manipulation of various media formats, such as MIPEG4, 11.264 MP3, AAC, AMR, JPG, PNG), graphics libraries (e.g., an OpenGL, framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 may include built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built-in applications 840 as well as a broad assortment of other applications. In a specific example, the third party applications 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries 816 (e.g., system library 834, API library 836, and other libraries 838), and frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. The virtual machine 848 creates a software environment where applications/modules can execute as if they were executing on a hardware machine (such as the machine 900 of FIG. 9, for example). The virtual machine 848 is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture executes within the virtual machine 848, such as an operating system 850, libraries 852, frameworks/middleware 854, applications 856 and/or presentation layer 858. These layers of software architecture executing within the virtual machine 848 can be the same as corresponding layers previously described or may be different.

Example Machine Architecture and Machine-Readable Medium

Figure 9:
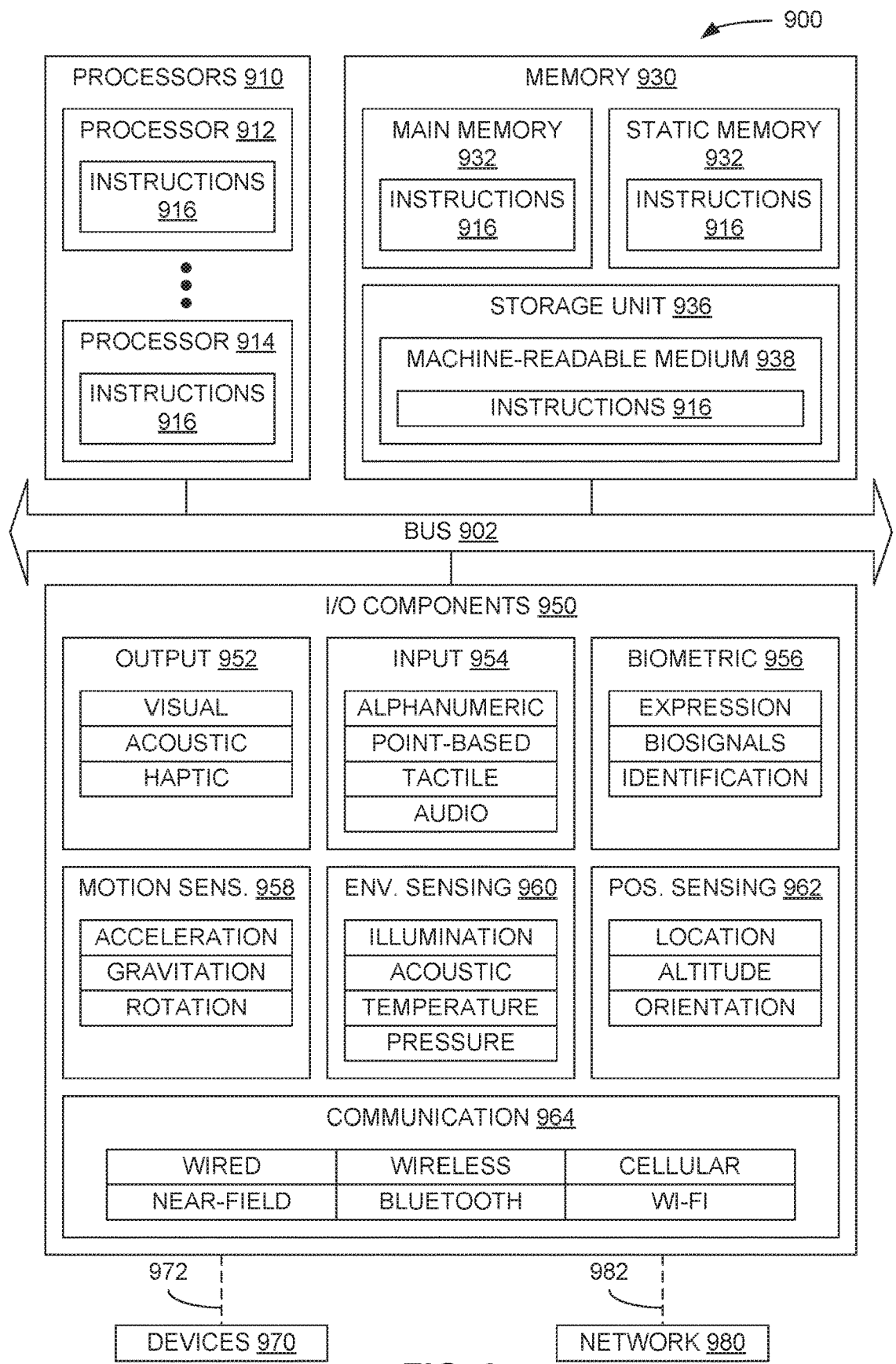
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagram of FIG. 4. Additionally, or alternatively, the instructions 916 may implement the asset access learning system 140 of FIG. 2, as well as the various modules and associated code segments thereof, as well as other systems described herein. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions 916 contemporaneously. Although FIG. 9 shows multiple processors 912, 914, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Electrically Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like, Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices a peripheral device coupled via a Universal Serial Bus (USB)).

Moreover, the communication components 964 may detect identifiers or include components operable to detect identifiers. For example, the communication components 964 may include Radio Frequency Identification (RFD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting an NEC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX™), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implement method comprising:
receiving an indication of an access attempt for a first computing asset using an identity of a first user of a plurality of users;
determining a security level associated with the first computing asset, the security level being determined based on at least one access characteristic associated with the first user, wherein the at least one access characteristic is generated by a machine learning algorithm;
selecting, based on the security level associated with the first computing asset, a first authentication process from a plurality of authentication processes; and
executing the first authentication process in relation to the access attempt for the first computing asset.

2. The computer-implemented method of claim 1, further comprising:
receiving an indication of an access attempt for a second computing asset using the identity of the first user;
determining a security level associated with the second computing asset, the security level associated with the second computing asset being higher than the security level associated with the first computing asset;
selecting, based on the security level associated with the second computing asset, a second authentication process from the plurality of authentication processes; and
executing the second authentication process in relation to the access attempt for the second computing asset.

3. The computer-implemented method of claim 2, wherein the second authentication process requires additional information not required in the first authentication process.

4. The computer-implemented method of claim 1, wherein the first authentication process is further selected based on a comparison of at least one access characteristic associated with the access attempt for the first computing asset and the at least one access characteristic for the first user.

5. The computer-implemented method of claim 4, wherein the at least one access characteristic for the first user is determined from access data indicating an access history of the first user to one or more computing assets.

6. The computer-implemented method of claim 5, wherein the at least one access characteristic for the first user is determined by:
analyzing, by the machine learning algorithm, the access data to generate a set of access characteristics for the first user that includes the at least one access characteristic for the first user.

7. The computer-implemented method of claim 4, wherein the first authentication process is selected based on the at least one characteristic associated with the current access attempt for the first computing asset being anomalous to the at least one access characteristic for the first user.

8. The computer-implemented method of claim 1, wherein the first authentication process is further selected based on a requested privilege level associated with the access attempt for the first computing asset.

9. One or more computer-readable media storing computer-useable instructions that, when used by one or more computing devices, cause the one or more computing devices to perform operations comprising:
receiving an indication of an access attempt for a first computing asset using an identity of a first user of a plurality of users;
determining a security level associated with the first computing asset, the security level being determined based on at least one access characteristic associated with the first user, wherein the at least one access characteristic is generated by a machine learning algorithm;
selecting, based on the security level associated with the first computing asset, a first authentication process from a plurality of authentication processes; and
executing the first authentication process in relation to the access attempt for the first computing asset.

10. The one or more computer-readable media of claim 9, further comprising:
receiving an indication of an access attempt for a second computing asset using the identity of the first user;
determining a security level associated with the second computing asset, the security level associated with the second computing asset being higher than the security level associated with the first computing asset;
selecting, based on the security level associated with the second computing asset, a second authentication process from the plurality of authentication processes; and
executing the second authentication process in relation to the access attempt for the second computing asset.

11. The one or more computer-readable media of claim 10, wherein the second authentication process requires additional information not required in the first authentication process.

12. The one or more computer-readable media of claim 9, wherein the first authentication process is further selected based on a comparison of at least one access characteristic associated with the access attempt for the first computing asset and the at least one access characteristic for the first user.

13. The one or more computer-readable media of claim 12, wherein the at least one access characteristic for the first user is determined from access data indicating an access history of the first user to one or more computing assets.

14. The one or more computer-readable media of claim 13, wherein the at least one access characteristic for the first user is determined by:
analyzing, by the machine learning algorithm, the access data to generate a set of access characteristics for the first user that includes the at least one access characteristic for the first user.

15. The one or more computer-readable media of claim 12, wherein the first authentication process is selected based on the at least one characteristic associated with the current access attempt for the first computing asset being anomalous to the at least one access characteristic for the first user.

16. The one or more computer-readable media of claim of claim 9, wherein the first authentication process is further selected based on a requested privilege level associated with the access attempt for the first computing asset.

17. A system comprising:
one or more processors; and
one or more computer-readable media storing computer-useable instructions that, when used by the one or more processors, cause the one or more processors to perform operations comprising:
receiving an indication of an access attempt for a first computing asset using an identity of a first user of a plurality of users;
determining a security level associated with the first computing asset, the security level being determined based on at least one access characteristic associated with the first user, wherein the at least one access characteristic is generated by a machine learning algorithm;
selecting, based on the security level associated with the first computing asset, a first authentication process from a plurality of authentication processes; and
executing the first authentication process in relation to the access attempt for the first computing asset.

18. The system of claim 17, further comprising:
receiving an indication of an access attempt for a second computing asset using the identity of the first user;
determining a security level associated with the second computing asset, the security level associated with the second computing asset being higher than the security level associated with the first computing asset;
selecting, based on the security level associated with the second computing asset, a second authentication process from the plurality of authentication processes; and
executing the second authentication process in relation to the access attempt for the second computing asset.

19. The system of claim 17, wherein the first authentication process is further selected based on a comparison of at least one access characteristic associated with the access attempt for the first computing asset and the at least one access characteristic for the first user, and wherein the at least one access characteristic for the first user is determined from access data indicating an access history of the first user to one or more computing assets.

20. The system of claim 19, wherein the first authentication process is selected based on the at least one characteristic associated with the current access attempt for the first computing asset being anomalous to the at least one access characteristic for the first user.

* * * * *